United States Patent
Konno

(10) Patent No.: US 12,367,659 B2
(45) Date of Patent: Jul. 22, 2025

(54) LEARNING DEVICE, LEARNING METHOD, INFERENCE DEVICE, AND STORAGE MEDIUM

(71) Applicant: Mitsubishi Electric Corporation, Tokyo (JP)

(72) Inventor: Yusaku Konno, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 413 days.

(21) Appl. No.: 17/915,518

(22) PCT Filed: Apr. 8, 2020

(86) PCT No.: PCT/JP2020/015841
§ 371 (c)(1),
(2) Date: Sep. 29, 2022

(87) PCT Pub. No.: WO2021/205573
PCT Pub. Date: Oct. 14, 2021

(65) Prior Publication Data
US 2023/0118767 A1    Apr. 20, 2023

(51) Int. Cl.
*G06T 7/00* (2017.01)
*G06V 10/26* (2022.01)
(Continued)

(52) U.S. Cl.
CPC ......... *G06V 10/774* (2022.01); *G06T 7/0008* (2013.01); *G06V 10/267* (2022.01);
(Continued)

(58) Field of Classification Search
CPC .... G06V 10/774; G06V 10/267; G06V 10/82; G06T 7/0008; G06T 2207/20021;
(Continued)

(56) References Cited

U.S. PATENT DOCUMENTS

| | | | |
|---|---|---|---|
| 10,748,650 B1* | 8/2020 | Ricci | G16H 30/20 |
| 11,062,458 B2* | 7/2021 | Yokoyama | G06N 3/084 |
| 2020/0175672 A1* | 6/2020 | Tanaka | G06T 7/0004 |

FOREIGN PATENT DOCUMENTS

| | | |
|---|---|---|
| JP | 2018-195119 A | 12/2018 |
| JP | 2018-205163 A | 12/2018 |
| JP | 2019-132594 A | 8/2019 |

OTHER PUBLICATIONS

International Search Report and Written Opinion mailed on Jul. 21, 2020, received for PCT Application PCT/JP2020/015841, filed on Apr. 8, 2020, 8 pages including English Translation.

* cited by examiner

*Primary Examiner* — Ping Y Hsieh
(74) *Attorney, Agent, or Firm* — XSENSUS LLP

(57) ABSTRACT

A learning device includes: a data acquisition unit that acquires learning target data that is full-size data of a learning target; a data generation unit that divides the learning target data to generate multiple pieces of first divided data that is divided data of the learning target data, and adds, to each piece of the first divided data, first identification information for identifying a region of the first divided data in the learning target data; and a model generation unit that generates a learned model for determining an anomaly in the first divided data using first correspondence information that is a set of the first divided data and the first identification information corresponding to the first divided data.

15 Claims, 10 Drawing Sheets

(51) Int. Cl.
*G06V 10/774* (2022.01)
*G06V 10/82* (2022.01)

(52) U.S. Cl.
CPC .... *G06V 10/82* (2022.01); *G06T 2207/20021* (2013.01); *G06T 2207/20081* (2013.01); *G06T 2207/20084* (2013.01); *G06T 2207/30108* (2013.01)

(58) Field of Classification Search
CPC . G06T 2207/20081; G06T 2207/20084; G06T 2207/30108; G06N 3/0499; G06N 3/088; G06N 3/09
See application file for complete search history.

|  | FULL-SIZE LEARNING | CUTTING LEARNING |
|---|---|---|
| NUMBER OF PIXELS ON ONE SIDE OF IMAGE | 1024 | 64 |
| NUMBER OF CHANNELS | 3(RGB) | 4(RGB+POSITION) |
| TOTAL NUMBER OF PIXELS | 3145728 | 16384 |
| TOTAL NUMBER OF IMAGES | 60 IMAGES | 15360 IMAGES |
| LEARNING TIME | ABOUT 720 MINUTES | ABOUT 40 MINUTES |

LEARNING DEVICE, LEARNING METHOD, INFERENCE DEVICE, AND STORAGE MEDIUM

CROSS-REFERENCE TO RELATED APPLICATION

The present application is based on PCT filing PCT/JP2020/015841, filed Apr. 8, 2020, the entire contents of which is incorporated herein by reference.

FIELD

The present disclosure relates to a learning device, a learning method, and an inference device for learning a normal state of an inspection target.

BACKGROUND

In manufacturing some products, inspection of the products may be performed by machine learning. A learning device that performs machine learning is configured to inspect manufactured products using a multilayered neural network, for example.

The anomaly detection device described in Patent Literature 1 receives normal image data for learning as an input, and performs machine learning such that its output data becomes the same as the normal image data for learning. This anomaly detection device extracts feature components from image data of an inspection target based on the learning result, and determines the absence or presence of an anomaly in the inspection target based on a difference between the feature components and the image data of the inspection target.

CITATION LIST

Patent Literature

Patent Literature 1: Japanese Patent Application Laid-open No. 2018-195119

SUMMARY

Technical Problem

However, it takes a longer time to learn if learning data such as image data has a larger data size. A possible method to shorten the learning time is to divide the learning data into pieces and perform machine learning using the divisional pieces of learning data. Suppose that this method is applied to the anomaly detection device described in Patent Literature 1. In this case, learning data for determining the absence or presence of an anomaly is divided into a plurality of learning data pieces, but the position of each of the divisional learning data pieces is not managed at all. Therefore, if a learning data piece exhibiting an abnormal sate is the same as a learning data piece exhibiting a normal state at a position different from a position of the abnormal learning data piece, the anomaly detection device erroneously determines that the abnormal learning data piece corresponds to a learning data exhibiting a normal state, and cannot execute accurate machine learning.

The present disclosure has been made in view of the above circumstances, and an object thereof is to provide a learning device capable of accurately performing machine learning of the normal state of an inspection target in a shorter time.

Solution to Problem

In order to solve the above-mentioned problems and achieve the object, the present disclosure provides a learning device comprising: a data acquisition unit to acquire learning target data that is full-size data of a learning target; a data generation unit to divide the learning target data to generate multiple pieces of first divided data that is divided data of the learning target data, and add, to each piece of the first divided data, first identification information for identifying a region of the first divided data in the learning target data; and a model generation unit to generate a learned model for determining an anomaly in the first divided data using first correspondence information that is a set or the first divided data and the first identification information corresponding to the first divided data.

Advantageous Effects of Invention

The learning device according to the present disclosure has an advantageous effect that it can accurately perform machine learning of the normal state of an inspection target in a shorter time.

DESCRIPTION OF EMBODIMENTS

Hereinafter, a learning device, a learning method, and an inference device according to embodiments of the present disclosure will be described in detail with reference to the drawings. The present disclosure is not necessarily limited by these embodiments.

First Embodiment

Figure 1:
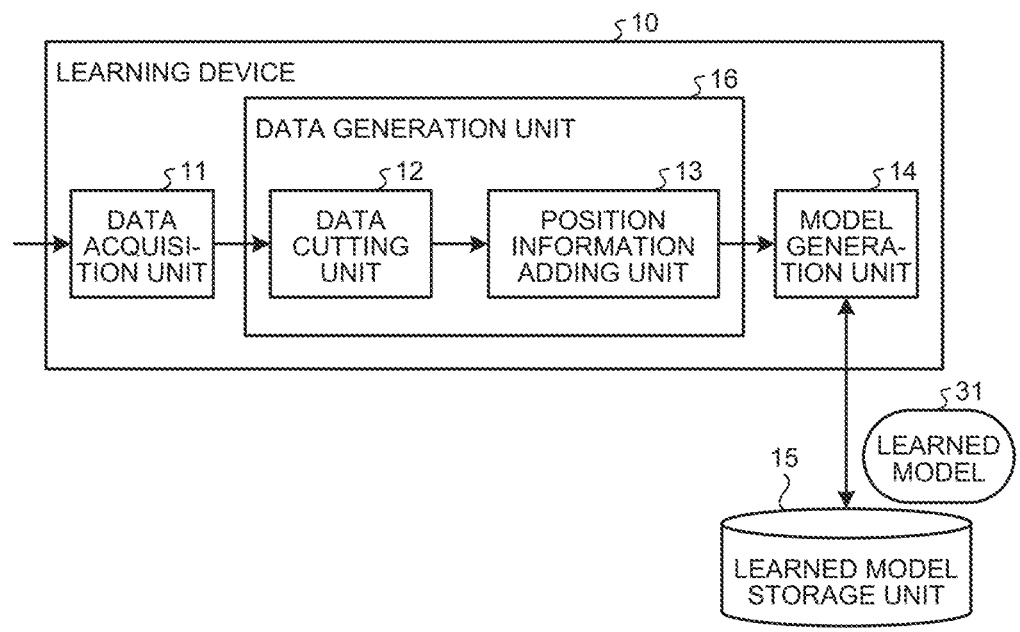
FIG. 1 is a diagram illustrating a configuration of a learning device according to a first embodiment.

FIG. 1 is a diagram illustrating a configuration of a learning device according to the first embodiment. The learning device 10 is a computer adapted to divide learning target data that is a learning sample of an inspection target into pieces, and performs machine learning of the inspection target having a normal state using the divisional learning target data pieces. The learning device 10 generates a learned model by the machine learning that is an example of artificial intelligence (AI), and an inference device (described later) uses the generated learned model to infer the inspection target having a normal state, and compares the inspection target with the inspection target having, a normal state, thereby to determine whether or not the inspection target is abnormal. Hereinafter, description is given for a case where the learning target and the inspection target are image data of a product, but the learning target and the inspection target may be data different from image data.

The learning device 10 may execute machine learning in any learning method. For example, the learning device 10 may execute machine learning through non-defective product learning using image data of non-defective products, or may execute machine learning using image data of non-defective products and defective products.

The learning device 10 divides the entire image data (hereinafter referred to as entirety data) to generate multiple divisional image data pieces (hereinafter referred to as divided data or divided data pieces). An example of the entirety data is data indicating an image of the whole of a product, that is, data representing a full-size image thereof, and an example of the divided data is data indicating a partial region of a product. The entirety data may be image data of an image of a product captured in any direction. In the first embodiment, description is given for a case where the entirety data is image data of an image of a product captured from the upper position.

The learning device 10 performs machine learning with associating a divided data piece with the position of the divided data piece in the entirety data. The learning device 10 includes a data acquisition unit 11, a data generation unit 16, and a model generation unit 14. The data generation unit 16 includes a data cutting unit 12 and a position information adding unit 13.

The data acquisition unit 11 acquires entirety data. The data acquisition unit 11 acquires the entirety data from an external device such as an imaging device that captures an image of a product, for example. The data acquisition unit 11 sends the acquired entirety data to the data generation unit 16.

The data cutting unit 12 divides the entirety data and cuts the divided data piece off from the entirety data. Note that the divided data piece may have an arbitrary size. For example, the entirety data is data of a rectangular image one side of which has 1024 pixels. The divided data piece is data of a rectangular image whose side has 64 pixels.

The position information adding unit 13 adds, to the divided data piece, cutting position information for identifying the region of the divided data piece in the entirety data. Cutting position information is represented by, for example, the coordinates of two or more vertices of the divided data piece in the entirety data. Note that cutting position information may be represented by the coordinates of one point in a divided data piece in the entirety data and a size.

The data generation unit 16 sends the cutting position information added by the position information adding unit 13 and the divided data piece generated by the data cutting unit 12 to the model generation unit 14 while associating the cutting position information with the divided data piece.

The model generation unit 14 generates a learned model 31 using correspondence information that is information in which the cutting position information and the divided data are associated with each other. In the first embodiment, the correspondence information is learning data for learning image data having a normal state (hereinafter referred to as normal data), that is, learning target data. In a case where the entirety data is divided into 100 pieces of divided data, the model generation unit 14 generates the learned model 31 using the correspondence information for the 100 pieces.

The model generation unit 14 learns the normal data on the basis of the correspondence information (learning data) generated based on a combination of the cutting position information and the divided data piece. That is, the model generation unit 14 generates the learned model 31 used to infer normal data from the cutting position information and the divided data piece. The model generation unit 14 generates one learned model 31 for the entirety data. Here, the learning data is data in which the cutting position information and the divided data piece are associated with each other.

The learned model 31 is configured to perform machine learning of image data of a product having a normal state using, for example, deep learning in which neural networks are stacked in a multilayered manner. In response to input or the correspondence information, the learned model 31 outputs image data having a normal state. In response to input of one piece of correspondence information, the learned model 31 outputs one piece of normal data.

The image data of the normal data outputted by the learned model 31 is image data of the same region as the divided data piece. In response to input of the divided data piece that is learning data, the learned model 31 performs machine learning such that the output data is image data representing a normal state. The learned model 31 performs machine learning of normal data, i.e., image data representing the product having a normal state, while extracting feature data characteristic of the learning data from the learning data. That is, the model generation unit 14 uses deep learning that extracts and learns a feature quantity as a learning algorithm to cause the neural network to learn while causing the network to extract features using a set of multiple pieces of learning target data that are normal learning samples as the inspection target. Consequently, the model generation unit 14 performs a sort of unsupervised learning with no input of a feature and with no input of any explicit teacher signal indicating that it is normal or anomaly, or the like and generates the learned model 31 that outputs normal data appropriate as normal data having a normal feature of the inspection target.

In the case where the learned model 31 is a model that uses a neural network, the neural network is composed of an input layer consisting of a plurality of neurons, an intermediate layer (hidden layer) consisting of a plurality of neurons, and an output layer consisting of a plurality of neurons. The number of intermediate layers may be one, or two or more.

Figure 2:
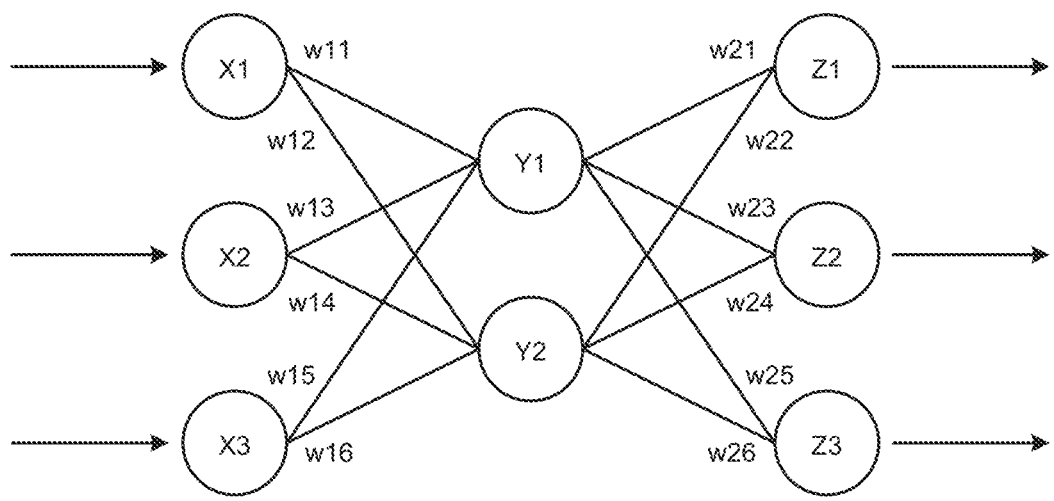
FIG. 2 is a diagram illustrating a configuration of a neural network that is used by the learning device according to the first embodiment.

FIG. 2 is a diagram illustrating a configuration of a neural network that is used by the learning device according to the first embodiment. For example, in the case where the neural network is a three-layered neural network as illustrated in FIG. 2, when a plurality of inputs is inputted to an input layer (X1 to X3), the values thereof are multiplied by weights W1 (w11 to w16) and inputted to an intermediate layer (Y1 to Y2), and the results thereof are further multiplied by weights W2 (w21 to w26) and outputted from an output layer (Z1 to Z3). The output results vary depending on the values of the weights W1 and W2.

The neural network learns normal data appropriate as normal data having one or more normal features through deep learning based on correspondence information that is a set of divided data piece generated by the data generation unit 16 and identification information corresponding to the divided data piece.

That is, the neural network performs learning based on adjustment of the weights W1 and W2 such that the correspondence information that is a set of the divided data piece and the identification information corresponding to the divided data piece is inputted to the input layer, a feature or features are extracted in the intermediate layer, and normal data appropriate as normal data having the extracted features is outputted from the output layer.

The model generation unit 14 executes the learning as lust described to generate the learned model 31, and outputs the generated learned model 31. A learned model storage unit 15 is a device configured to store the learned model 31 outputted from the model generation unit 14. The learned model storage unit 15 may be placed inside the learning device 10 or may be placed outside the learning device 10.

In the above-described case, a sort of unsupervised learning based on deep learning is used as the learning algorithm used by the model generation unit 14. However, publicly known algorithms may be used such as other types of unsupervised learning, supervised learning, send-supervised learning, and reinforcement learning. In addition, in the above-described case, a configuration of the neural network for deep learning is used as the configuration of the learned model 31. However, a configuration based on a different learning algorithm may be used.

Figure 3:
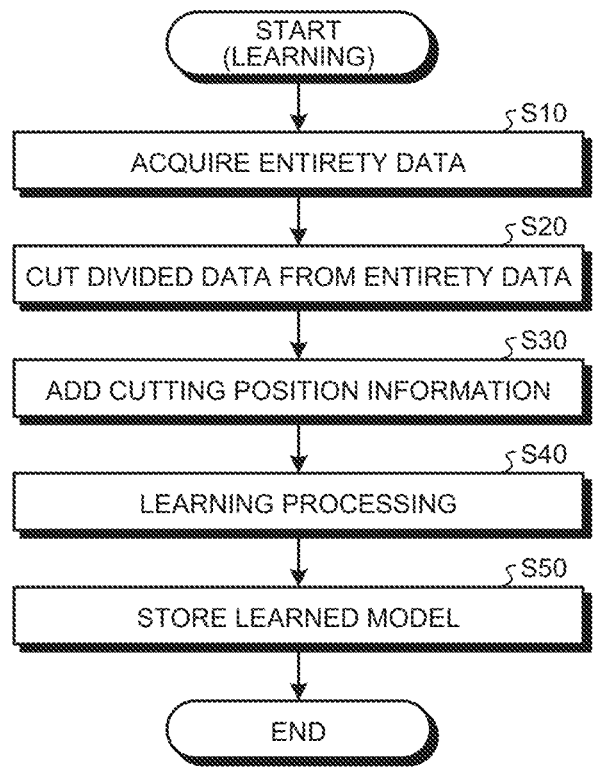
FIG. 3 is a flowchart illustrating a procedure for learning processing performed by the learning device according to the first embodiment.

Next, learning processing by the learning device 10 will be described with reference to FIG. 3. FIG. 3 is a flowchart illustrating a procedure for learning processing performed by the learning device according to the first embodiment. The data acquisition unit 11 acquires entirety data indicating an image of the whole of a product (step S10). The entirety data acquired here is used for the machine learning of normal data. The data generation unit 16 divides the entirety data and cuts the pieces of divided data from the entirety data (step S20).

The position information adding unit 13 adds, to a divided data piece, cutting position information for identifying the region of the divided data piece in the entirety data (step S30). The data generation unit 16 sends, to the model generation unit 14, correspondence information in which the cutting position information added by the position information adding unit 13 and the divided data piece generated by the data cutting unit 12 are associated with each other.

The model generation unit 14 executes the learning process of the learned model 31 (step S40). Specifically, the model generation unit 14 generates the learned model 31 using the correspondence information in which the cutting position information and the divided data piece are associated with each other. In other words, the model generation unit 14 learns normal data through what is called unsupervised learning, in accordance with the learning data generated based on the combination of the cutting position information and the divided data piece, and generates the learned model 31. The learned model storage unit 15 stores the learned model 31 generated by the model generation unit 14 (step S50).

Figure 4:
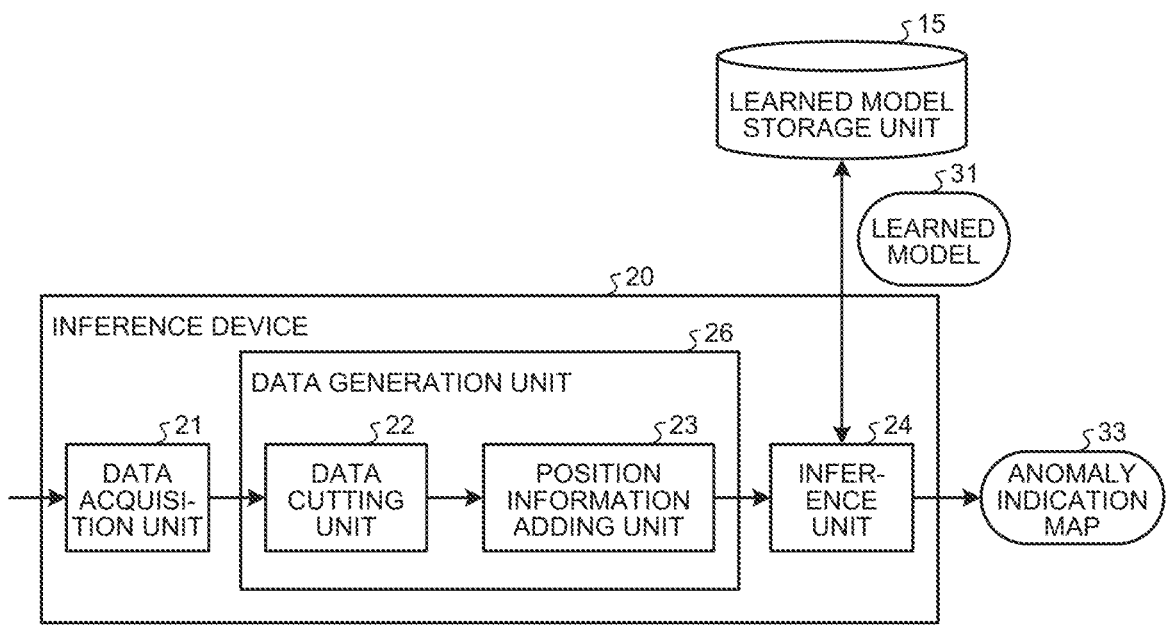
FIG. 4 is a diagram illustrating a configuration of an inference device according to the first embodiment.

Next, an inference device that infers normal data using the learned model 31 and determines whether an anomaly occurs in inference target data will be described. FIG. 4 is a diagram illustrating a configuration of an inference device according to the first embodiment. The inference device 20 includes a data acquisition unit 21, a data generation unit 26, and an inference unit 24. The data generation unit 26 includes a data cutting unit 22 and a position information adding unit 23.

The data acquisition unit 21 has the same function as the data acquisition unit 11, and the data generation unit 26 has the same function as the data generation unit 16. Whereas the data acquisition unit 11 acquires entirety data to be used as learning data, the data acquisition unit 21 acquires entirety data to be used as inspection data. The entirety data to be used as inspection data is inference target data. In addition, whereas the data generation unit 16 generates the correspondence information to be used as learning data, the data generation unit 26 generates correspondence information to be used as inspection data. The data generation unit 26 sends the generated correspondence information to the inference unit 24.

The inference unit 24 receives the correspondence information sent from the data generation unit 26. The inference unit 24 infers normal data from the correspondence information with use of the learned model 31 stored in the learned model storage unit 15. That is, the inference device 20 infers normal data appropriate as normal data having normal features of the correspondence information, based on input of the correspondence information of the inspection data to the learned model 31. At this time, the inference unit 24 infers normal data for each divided data piece on the basis of the divided data piece of the inspection data and the cutting position information that serves as identification information.

The inference unit 24 compares the normal data that is the inference result with the divided data piece in the correspondence information received from the data generation unit 26, and identifies a portion in which a certain difference occurs between the normal data and the divided data piece, as an abnormal portion. At this time, the inference unit 24 determines, for each divided data piece, the difference between the normal data and the divided data.

The inference unit 24 generates an anomaly indication map 33 indicating the abnormal portion on the basis of the determination result for each divided data piece, and outputs the anomaly indication map 33 to an external device as an inspection result. The anomaly indication map 33 is a map that shows the abnormal portion of the entire image data in a different color or in any other manner such that the abnormal portion is distinguishable from other portions. The anomaly indication map 33 is obtained by overwriting the entirety data with the mapped abnormal portions. In a case where the external device to which the inference unit 24 outputs the anomaly indication map 33 is a display device such as a display, the display device displays the anomaly indication map 33. Note that the external device to which the anomaly indication map 33 is outputted may be an alarm device or the like.

In the above-described example, the inference unit 24 generates the anomaly indication map 33 indicating the abnormal portions. However, the inference unit 24 need not necessarily identify the abnormal portion, and may determine whether each divided data piece is abnormal or not, then determine that the entirety data of the inspection target is abnormal if any of the divided data pieces is abnormal, and output only the determination of whether there is an anomaly as the inspection result. In addition, the inference unit 24 may first combine the pieces of normal data associated with the respective pieces of divided data to generate the normal data for a full-size image corresponding to the entirety data, and then compare the entirety data with the normal data corresponding to the entirety data to thereby determine an anomaly.

In the first embodiment, description is given for an example in which the inference device 20 outputs the anomaly indication map 33 using the learned model 31 obtained by the learning in the model generation unit 14 of the learning device 10, but the inference device 20 may use the learned model 31 obtained by learning in a device different from the learning device 10. In the latter case, the inference device 20 may acquire the learned model 31 from another external device or the like different from the learning device 10, and output the anomaly indication map 33 based on this learned model 31.

Note that the learning device 10 and the inference device 20 may be connected via a network, for example. In this case, the learned model 31 generated by the learning device 10 is sent to the inference device 20 via the network.

Figure 5:
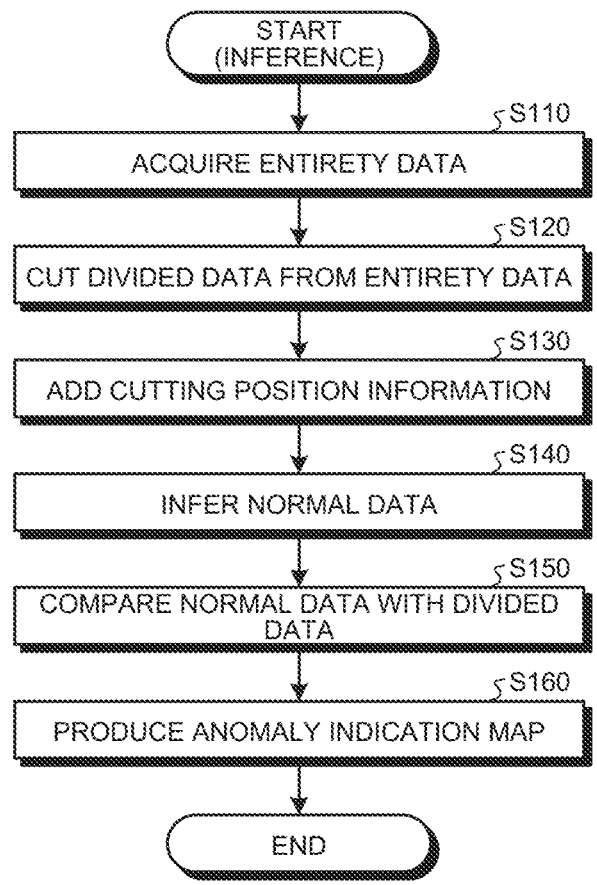
FIG. 5 is a flowchart illustrating a procedure for inference processing performed by the inference device according to the first embodiment.

Next, inference processing performed by the inference device 20 will be described with reference to FIG. 5. FIG. 5 is a flowchart illustrating a procedure for inference processing performed by the inference device according to the first embodiment. The data acquisition unit 21 acquires entirety data indicating an image of the whole of a product (step S110). The entirety data acquired in this step is used for the inference processing of normal data. The data generation unit 26 divides the entirety data and cuts the pieces of divided data from the entirety data (step S120).

The position information adding unit 23 adds, to each divided data piece, cutting position information for identifying the region of the divided data piece in the entirety data (step S130). The data generation unit 26 sends, to the inference unit 24, correspondence information in which the cutting position information added by the position information adding unit 23 and the divided data piece generated by the data cutting unit 22 are associated with each other.

The inference unit 24 receives the correspondence information sent from the data generation unit 26. The inference unit 24 infers normal data from the correspondence information using the learned model 31 stored in the learned model storage unit 15 (step S140). At this time, the inference unit 24 infers the normal data for each piece of divided data. The learned model 31 used by the inference unit 24 outputs the normal data in response to the input of the correspondence information in which the cutting position information and the divided data are associated with each other.

The inference unit 24 compares the normal data that is the inference result with the divided data piece in the correspondence information received from the data generation unit 26 (step S150), and determines the difference between the normal data and the divided data piece based on the comparison result. At this time, the inference unit 24 determines, for each piece of divided data, the difference between the normal data and the divided data piece. The inference unit 24 generates the anomaly indication map 33 based on the difference between the normal data and the divided data piece (step S160). The inference unit 24 outputs the generated anomaly indication map 33 to an external device.

Note that the inference device 20 may execute learning for normal data while inferring the normal data using the learned model 31. In this case, the learned model 31 is updated to a new learned model 31 as the result of the learning performed by the inference device 20.

Figure 6:
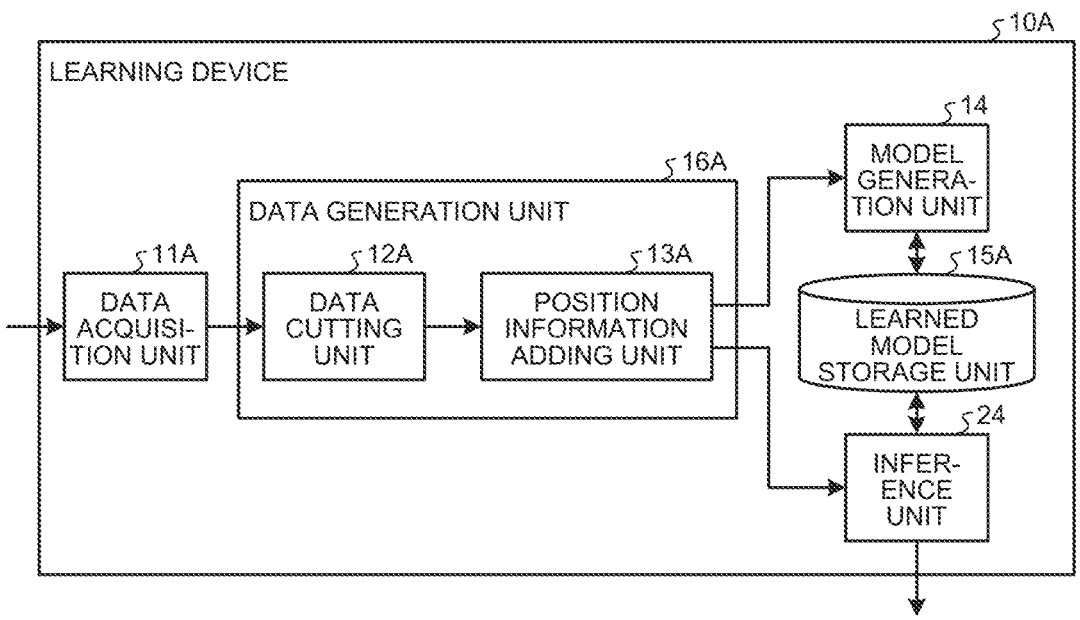
FIG. 6 is a diagram illustrating a configuration of a learning device having a function of the inference device described in FIG. 4.

In addition, the learning and inference of the normal data may be executed by a learning device in which the learning device 10 and the inference device 20 are combined. FIG. 6 is a diagram illustrating a configuration of a learning device having a function of the inference device described in FIG. 4. The learning device 10A having a function of the inference device 20 includes a data acquisition unit 11A, a data generation unit 16A, the model generation unit 14, a learned model storage unit 15A, and the inference unit 24. The data generation unit 16A includes a data cutting unit 12A and a position information adding unit 13A. The data acquisition unit 11A serves as both the data acquisition unit 11 and the data acquisition unit 21. The data generation unit 16A serves as both the data generation unit 16 and the data generation unit 26.

Note that the learning device 10A may include the data acquisition unit 21 instead of the data acquisition unit 11A. In addition, the learning device 10A may include the data generation unit 26 instead of the data generation unit 16A. The learning device 10A may include both of the data acquisition unit 11 and the data acquisition unit 21. The learning device 10A may include both of the data generation unit 16 and the data generation unit 26.

For the machine learning in a preparation stage of inspection, the learning device 10A acquires and learns entirety data as a normal sample of the inspection target, thereby generating and storing the learned model 31. For an operation stage of inspection following the machine learning, the learning device 10A acquires the entirety data of the inspection target, and determines an anomaly in the inspection target using the learned model 31 generated and stored by the machine learning.

When the learning device 10A executes the machine learning of the normal data in the preparation stage of inspection, the data acquisition unit 11A acquires the entirety data of the normal learning sample to be used in the learning of the normal data. In the data generation unit 16A, the data cutting unit 12A cuts off one or more divided data pieces from the entirety data, and the position information adding unit 13A adds cutting position information to each of the divided data pieces. The data generation unit 16A sends the cutting position information added by the position information adding unit 13A and the divided data pieces generated by the data cutting unit 12A to the model generation unit 14 in association with each other. The model generation unit 14 generates the learned model 31 using the correspondence information in which the cutting position information and the divided data are associated with each other. The learned model 31 is stored in the learned model storage unit 15A.

When the learning device 10A determines an anomaly in the operation stage of inspection, the data acquisition unit 11A acquires the entirety data of the inspection target data. In the data generation unit 16A, the data cutting unit 12A cuts off one or more divided data pieces from the entirety data, and the position information adding unit 13A adds cutting position information to each of the divided data pieces. The data generation unit 16A sends the cutting position information added by the position information adding unit 13A and the divided data pieces generated by the data cutting unit 12A to the inference unit 24 in association with each other. The inference unit 24 executes the inference of the normal data using the correspondence information in which the cutting position information and the divided data piece are associated with each other and the learned model 31 stored in the learned model storage unit 15A. The inference unit 24 executes the inference of the normal data by processing similar to the processing described with reference to FIGS. 4 and 5.

In the learning device 10A, the divided data in machine learning is first divided data, and the cutting position information in learning is first identification information. In addition, in the learning device 10A, the correspondence information in machine learning is first correspondence information, and the normal data in machine learning is first normal data.

In addition, in the learning device 10A, the divided data in inference is second divided data, and the cutting position information in inference is second identification information. In addition, in the learning device 10A, the correspondence information in inference is second correspondence information, and the normal data in inference is second normal data.

Note that the learning device 10 may be built into the inference device 20, or otherwise the inference device 20 may be built into the learning device 10. In addition, at least one of the learning device 10 and the inference device 20 may be built into an imaging device that captures image data of the entirety data. In addition, the learning device 10 and the inference device 20 may exist on a cloud server.

Figure 7:
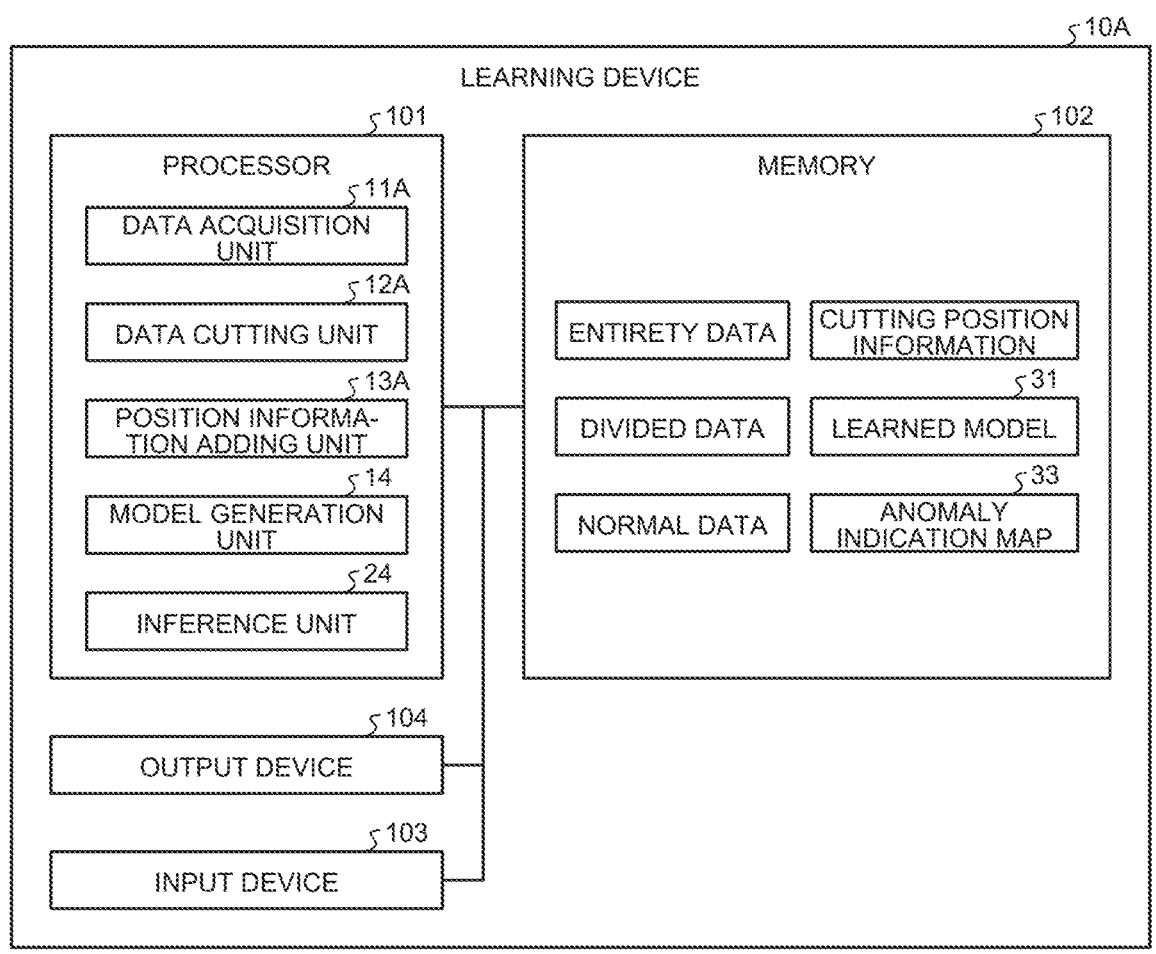
FIG. 7 is a diagram illustrating a hardware configuration of the learning device illustrated in FIG. 6.

FIG. 7 is a diagram illustrating a hardware configuration of the learning device illustrated in FIG. 6. The learning device 10A can be implemented by an input device 103, a processor 101, a memory 102, and an output device 104. The processor 101 is exemplified by a central processing unit (CPU; also referred to as a central processing device, a processing device, a computation device, a microprocessor, a microcomputer, a digital signal processor (DSP), or a graphics processing unit (GPU)), or a system large scale integration (LSI) circuit. The memory 102 is exemplified by a random access memory (RAM) or a read only memory (ROM).

The learning device 10A is implemented by the processor 101 reading and executing a computer-executable learning program stored in the memory 102 for executing the operation of the learning device 10A. It can also be said that the learning program that is a program for executing the operation of the learning device 10A causes a computer to execute the procedure or method for the learning device 10A.

The learning program to be executed by the learning device 10A has a module configuration including the data acquisition unit 11A, the data generation unit 16A, the model generation unit 14, and the inference unit 24, which are loaded on a main storage device and produced on the main storage device.

The input device 103 receives entirety data and sends the entirety data to the processor 101. The memory 102 is used as a temporary memory when the processor 101 executes various processes. In addition, the memory 102 stores entirety data, divided data, cutting position information, the learned model 31, normal data, the anomaly indication map 33, and so on. The output device 104 outputs the normal data, the anomaly indication map 33, and so on to an external device.

The learning program may be stored in a computer-readable storage medium in an installable or executable file and provided as a computer program product. Alternatively, the learning program may be provided to the learning device 10A via a network such as the Internet. Note that a part of the function of the learning device 10A may be implemented by dedicated hardware such as a dedicated circuit, and the other part thereof may be implemented by software or firmware. In addition, the learning device 10 and the inference device 20 can also be implemented by a hardware configuration similar to that of The learning device 10A.

In a case where the learning device 10 carries out unsupervised learning, other publicly known methods may be used besides the deep learning described above. For example, the learning device 10 may use non-hierarchical clustering based on K-means.

In addition, the model generation unit 14 may learn the normal data according to the entirety data generated for a plurality of products. Note that the model generation unit 14 may acquire entirety data from a plurality of products used in one and the same area, or may learn the normal data using the entirety data collected from a plurality of products in different areas. In addition, for the model generation unit 14, it is possible to add a data collection device such as an imaging device from which entirety data is collected to the objects, or to remove some data collection device from the objects. Furthermore, a learning device that has learned normal data for a certain product may be applied to a different learning device, and that different learning device may relearn normal data to update the learned model.

Here, normal data learning processing and inference processing using cutting position information will be described.

FIG. 6 is a diagram for explaining normal data learning processing and inference processing performed by the learning device illustrated in FIG. 6. Note that description is given for a case where the learning device 10A learns normal data, but the learning of the normal data may be performed by the learning device 10. In addition, the inference for anomaly determination may be performed by the inference device 20.

First, learning processing for the machine learning in a preparation stage of inspection will be described, in which entirety data is acquired and learned as the normal sample of the inspection target and the learned model 31 is generated.

The data acquisition unit 11A of the learning device 10A acquires an entirety image 51 that is a full-size image for learning as the entirety data of the normal learning sample of the inspection target to be used in machine learning. The data cutting unit 12A divides the entirety image 51 into specific sizes, and cuts off divided data pieces D1 to Dn (n is a natural number) from the entirety image 51.

In addition, the position information adding unit 13A adds cutting position information pieces P1 to Pn to the divided data pieces D1 to Dn that are a group of images, respectively. The position information adding unit 13A adds cutting position information Pm to divided data Dm (m is a natural number of one to n). For example, the data cutting unit 12A divides the entirety image 51 whose side consists of 1024 pixels into the dvided data pieces D1 to Dn each of which has a side consisting of 64 pixels. In this case, adjacent divided data pieces may overlap with each other in their partial areas.

The model generation unit 14 inputs, to the learned model 31, correspondence information in which the divided data Dm and the cutting position information Pm are associated with each other. In this manner, the model generation unit 14 cuts the entirety image 51 that is a full-size image for learning into specific sizes, and inputs a set of the divided data Dm that is a group of cutaway images and the cutting position information Pm simultaneously to the learned model 31. In this example, machine learning is performed through deep learning such that features of the image of the normal divided data Dm are extracted in the intermediate layer of the neural network in association with a set of the divided data Din and the cutting position information Pm, and an image of normal data appropriate as normal data having the extracted features is outputted. Consequently, the learned model 31 is subjected to machine learned such that correspondence information in which normal data that is a learning result and the cutting position information Pm corresponding to this normal data are associated with each other is outputted.

In the machine learning, a plurality of learning samples are usually prepared, and machine learning is performed based on multiple entirety data sets obtained from the plurality of learning samples. Consequently, machine learning is executed such that normal data appropriate as normal data in which variations in the range determined to be normal are considered can be outputted. The variations can include, for example, variations in placement of components attached to the inspection target, and variations an environment such as brightness when capturing an image of the inspection target with a camera or the like to acquire an image.

The model generation unit 14 sequentially inputs sets of the divided data Dm and the cutting position information Pm to one learned model 31 thereby to sequentially perform machine learning of the normal data corresponding to the divided data pieces D1 to Dn. The learned model 31 is subjected to machine learning such that correspondence information in which normal data as a learning result and the cutting position information Pm corresponding to the normal data are associated with each other can be outputted for each divided data piece.

When inputting, to the learned model 31, one correspondence information set in which the divided data Dm and the cutting position information Pm are combined, the model generation unit 14 divides the correspondence information set into information pieces each of which is per one pixel included in the correspondence information set.

The model generation unit 14 inputs the divisional information piece of each pixel to the input layer of the learned model 31. That is, the model generation unit 14 performs machine learning such that the divided data piece Dm into pixels, input the data of each pixel to the learned model 31, and output normal data from the learned model 31 for each pixel.

For example, in a case where the divided data piece Dm has one side of 64 pixels, the model generation unit 14 inputs the data of 64×64 pixels to the learned model 31, and causes the learned model 31 to output the data of 64×64 normal pixels.

The learned model 31 generated by the model generation unit 14 can generate one image of normal data corresponding to one image of divided data on the basis of the data of pixels outputted by the learned model 31. The image generated as the normal data is divided data Rm. The divided data Rcorresponds to the divided data Dm and is associated with the cutting position information Pm. The learned model 31 outputs correspondence information in which the divided data Rm that is normal data is associated with the cutting position information Pm. The generated learned model 31 is stored in the learned model storage unit 15A.

Note that the learned model 31 may associate an input layer and an of layer with each pixel so that the received pixel and the outputted pixel are at the same position, and generate one piece of divided data Rm on the basis of the positions of the input layer and the output layer of each pixel. In addition, the cutting position information corresponding to the divided data Rm as the normal data outputted from the learned model 31 when the cutting position information Pm corresponding to the divided data Dm is inpuLted to the learned model 31 may be used with reference to the cutting position information Pm inputted to the learned model 31. Therefore, the learned model 31 may output only the divided data Rm as normal data without outputting the cutting position information.

Next, inference processing in an operation stage of inspection following the machine learning will be described, in which the entirety data of the inspection target is acquired and an anomaly in the inspection target is determined using the learned model 31 generated and stored in the machine learning.

The data acquisition unit 11A of the learning device 10A acqures the entirety image 51 that is a full-size image of the inspection target as the entirety data to be used for inspection. The data cutting unit 12A divides the entirety image 51 into specific sizes, and cuts off the divided data pieces D1 to Dn from the entirety image 51, as in the learning processing in the preparation stage.

In addition, the position information adding unit 13A adds the cutting position information pieces P1 to Pn respectively to the divided data pieces D1 to Dn that are a group of images, as in the learning processing. The position information adding unit 13A adds the cutting position information Pm to the divided data Dm. For example, the data cutting unit 12A divides the entirety image 51 having one side of 1024 pixels into the divided data pieces D1 to Dn having one side of 64 pixels. Adjacent divided data pieces may overlap with each other in their partial areas.

The inference unit 24 acquires in advance the learned model 31 subjected to machine learning and stored in the learned model storage unit 15A in the learning processing in the preparation stage, and inputs correspondence information in which the cutting position information Pm and the divided data Dm are associated with each other, to the learned model 31. In this manner, the inference unit 24 cuts the entirety image 51 that is a full-size image for learning into specific sizes, and inputs a set of the divided data Dm that is a group of the cutaway images and the cutting position information Pm simultaneously to the learned model 31. Consequently, the learned model 31 outputs correspondence information in which normal data as a learning result and the cutting position information Pm corresponding to the normal data are associated with each other. Note that the cutting position information corresponding to the divided data Rm as the normal data outputted from the learned model 31 may be identified with reference to the cutting position information Pm inputted to the learned model 31, and so the learned model 31 may output only the divided data Rm as normal data without outputting the cutting position information.

Figure 8:
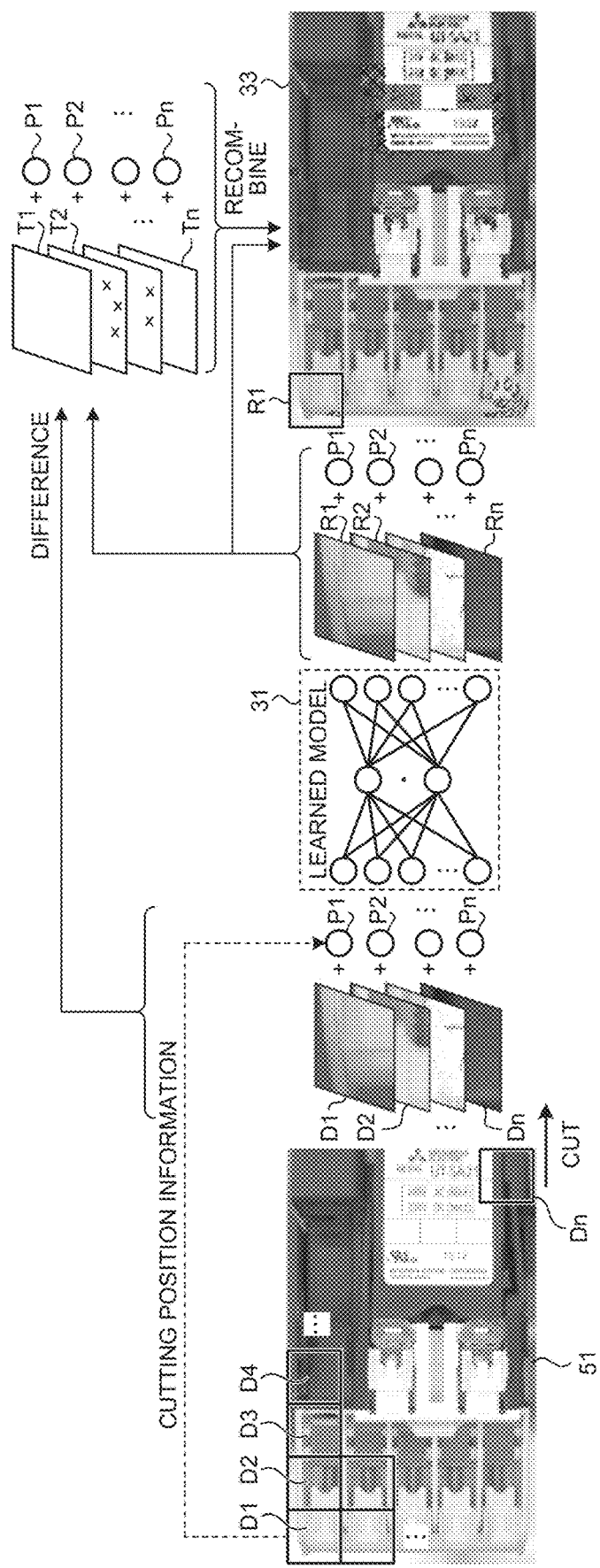
FIG. 8 is a diagram for explaining normal data learning processing and inference processing, performed by the learning device illustrated in FIG. 6.

The inference unit 24 sequentially inputs sets of the divided data Dm and the cutting position information Pm of the inspection target to one learned model 31, thereby to sequentially infer the normal data corresponding to the divided data pieces D1 to Dn. The learned model 31 outputs, for each piece of divided data, correspondence information in which normal data as an inference result and the cutting position information Pm corresponding to the normal data are associated with each other. In FIG. 8, the normal data outputted by the learned model 31 is represented by a group of images of divided data pieces R1 to Rn.

When inputting, to the learned model 31, one correspondence information set in which the divided data Dm and the cutting position information Pm of the inspection target are combined, the inference unit 24 divides the correspondence information into information pieces each of which is per pixel included in the correspondence information.

The inference unit 24 inputs the divisional information piece of each pixel to the input layer of the learned model 31. That is, the inference unit 24 divides each piece of divided data Dm into pixels, inputs the data of each pixel to the learned model 31, and causes the learned model 31 to output normal data for each pixel.

For example, in a case where the divided data piece Dm has one side of 64 pixels, the inference unit 24 inputs the data of 64×64 pixels to the learned model 31, and causes the learned model 31 to output the data of 64×64 normal pixels.

The inference unit 24 generates one image of normal data corresponding to one image of divided data on the basis of the data of pixels outputted from the learned model 31. The image generated as the normal data is the divided data Rm. The divided data Rm corresponds to the divided data Dm and is associated with the cutting position information Pm. The learned model 31 outputs correspondence information in which the divided data Rm that is normal data is associated with the cutting position information Pm.

The inference unit 24 compares the divided data Rm with the divided data Dm, and generates divided data Tm representing a difference between Rm and Dm. That is, the inference unit 24 compares the divided data Dm inputted to the learned model 31 with the divided data Rm outputted from the learned model 31, and generates the divided data Tm that is a comparison result. That is, the inference unit 24 generates divided data pieces T1 to Tn corresponding to the divided data pieces D1 to Dn. The divided data pieces D1 to Dn correspond to the divided data pieces R1 to Rn, respectively, and the divided data pieces R1 to Rn correspond to the divided data pieces T1 to Tn, respectively.

The divided data Tm is data representing a difference between the divided data Rm that is normal data and the divided data Dm that is input data. Therefore, the divided data Tm data representing an abnormal portion.

The inference unit 24 generates the anomaly indication map 33 using the divided data pieces T1 to Tn that are a group of images. Specifically, the inference unit 24 generates the anomaly indication map 33 corresponding to the entirety image 51 by recombining the divided data pieces T1 to Tn outputted from the learned model 31 and superimposing the resultant of the recombination on the entirety image 51.

In this manner, the inference unit 24 determines an anomaly in the divided data Rm by comparing the divided data Rm, i.e., normal data inferred by the learned model 31 based on the divided data Dm and the cutting position information Pm, with the divided data Dm received from the data generation unit 16A, and identifies a portion having an abnormal state an the divided data Rm. Then, the inference unit 24 generates, based on the thus-obtained identification result, the anomaly indication map 33 in which the portion having an abnormal state in the entirety image 51 is specified.

Figure 9:
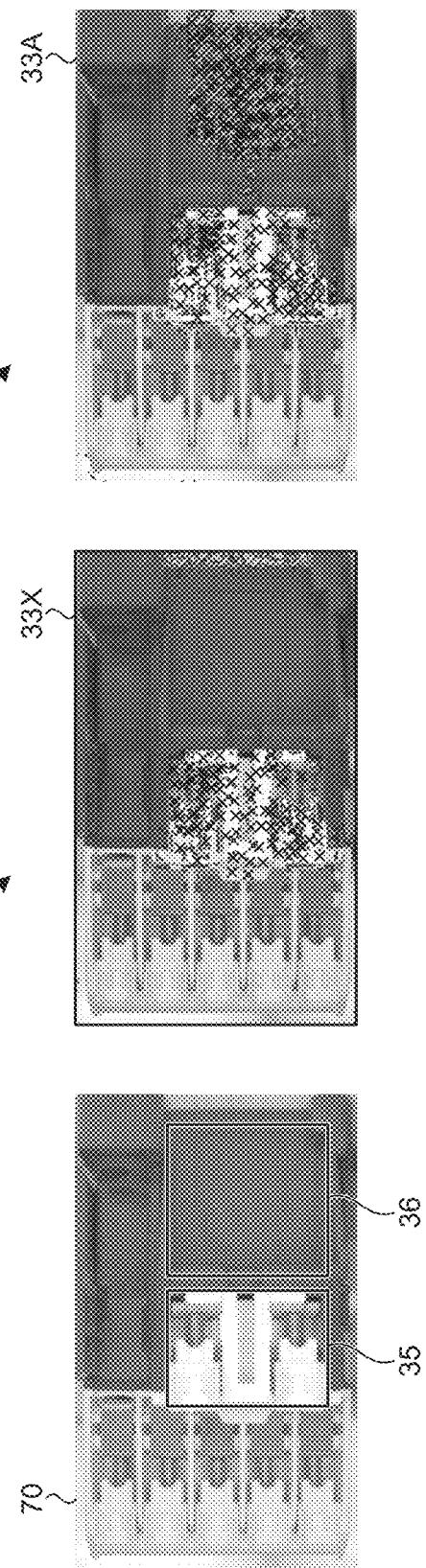
FIG. 9 is a diagram for explaining a difference between an anomaly indication map generated by the inference device according to the first embodiment using cutting position information and the anomaly indication map generated without using the cutting position information.

Now the description is given for a difference between the anomaly indication map 33 generated based on the learned model 31 subjected to machine learning using the divided data Dm and the cutting position information pieces P1 to Pn and the anomaly indication map generated based on the learned model 31 subjected to machine learning using the divided data Dm without using the cutting position information pieces P1 to Pn. FIG. 9 is a diagram for explaining the difference between an anomaly indication map generated by the inference device according to the first embodiment using the cutting position information and another anomaly indication map generated without using the cutting position information.

Here, a case where the anomaly indication maps are generated for an inspection target image 70 including abnormal portions 35 and 36 will be described. The inspection target image 70 is a full-size image for learning, which is obtained by capturing an image of a specific product. The abnormal portion 35 is a portion where arrangement of components has position aberration. The abnormal portion 36 is a portion that lacks a label seal which should be present intrinscally.

The anomaly indication map 33X is an anomaly indication map generated for the inspection target image 70 using the learned model 31 subjected to machine learning without using the cutting position information corresponding to the divided data Dm. That is, the anomaly indication map 33X is an inspection result image obtained in a case where the machine learning is performed without using identification information for identifying regions of the divided data Dm in the full-size learning target data.

The abnormal portion 36 included in the inspection target image 70 is divided into pieces of divided data Dm as with the other portions. In this case, because each piece of the divided data Dm is small, the divided data Dm in the abnormal portion 36 may be substantially the same as the normal divided data Dm. That is, there may be a case where the divided data Dm in the abnormal portion 36 is similar to the divided data Dm in some place other than the abnormal portions 35 and 36. In other words, when the divided data Dm is cut, there may be a normal image portion similar to an abnormal portion that lacks a label some place other than the abnormal portions 35 and 36. In this case, the learned model 31 subjected to machine learning without using identification information corresponding to the divided data Dm cannot distinguish between the divided data Dm in the abnormal portion 36 and a similar normal image portion, and outputs normal data that is the learning result of the similar normal image portion. Therefore, the divided data Dm in the abnormal portion 36 is identified as the normal divided data Dm by being compared with the normal data of the similar normal image portion outputted from the learned model 31. Thus, the anomaly indication map 33X represents the abnormal portion 35 as an abnormal portion, but erroneously represents the abnormal portion 36 as a normal portion.

The anomaly indication map 33A is an anomaly indication map generated for the inspection target image 70 using the learned model 31 subjected to machine learning using the divided data Dm and the cutting position information pieces P1 to Pn. That is, the anomaly indication map 33A is an inspection result image obtained in a case where the machine learning is performed using the divided data Dm and identification information for identifying regions of the divided data Dm in the full-size learning target data.

In the case where the learning device 10A generates the learned model 31 trough machine learning using the cutting position information pieces P1 to Pn, the divided data Dm have different pieces of cutting position information Pm even if the divided data Dm of the abnormal portion 36 is similar to the divided data Dm in some other normal portion. Therefore, the learning device 10A can output the learning result with distinguishing between the divided data Dm of the abnormal portion 36 and the divided data Dm in the other normal portion. As a result, the inference unit 24 of the learning device 10A can accurately determine whether or not there is an anomaly in each piece of divided data Dm of the inspecton target based on the divided data Dm of the inspection target and the cutting position information pieces P1 to Pn.

Although the first embodiment has been described for a case where the learning target and the inspection target are two-dimensional image data, the learning target and the inspection target may be one-dimensional data such as a data string in which data values of a time-series waveform are lined up at regular time intervals, or may be multi-dimensional data in which multiple pieces of data are combined. Data combined as multi-dimensional data may be measurement data such as electric current value data, or may be image data. One-dimensional data is exemplified by an electric current waveform that is a time-series waveform obtained by measuring the value of an electric current flowing through the product during the operation of the product. If the operation of the product includes a plurality of operation stages, there is a feature of the current waveform for each time region of each of the operation stages have different current waveform features. In this case, the learning device 10 generates divided data obtained by dividing the current waveform into a plurality of time regions, and performs machine learning of a normal divided current waveform having normal features for each time region with use of the correspondence information in which the divided current waveform which is the divided data of each time region and region identification information foridentifying the cdvided data of each time region are associated with each other to generate the learned model 31. In addition, the inference device 20 acquires the current waveform of the product that is an inspection target, divides the current waveform into divided data pieces of a plurality of time regions, infers the normal data of the current for each time region based on the learned model 31 using correspondence information in which the divided data and the region identification information for identifying each time region are associated with each other, and compares the divided data with the normal data, so as to determine an anomaly in the current waveform of the inspection target.

The learning device 10 and the inference device 20 are applied to, for example, inspection of products in the manufacturing industry (e.g., appearance inspection using images). Because the learning device 10 and the inference device 20 divide the entirety data into the divided data pieces D1 to Dn and infer the normal data using the cutting position information pieces P1 to Pn, they can efficiently learn the normal data at reduced learning cost. The learning cost as said herein includes a calculation time, the number of computers, the number of learning samples, and the like.

In addition, because the learning device 10 and the inference device 20 can reduce the learning cost, it is possible to perform the machine learning of the inspection target in a short time even when there are more than several hundreds or several thousands types of products or even when there are a large number of inspection processes in a factory manufacturing personal computer (PC) substrates, factory automation (FA) devices, or the like. In addition, because the learning device 10 and the inference device 20 can reduce the learning cost, it is possible to accurately perform the machine learning of the inspection target in a short time even when the machine learning is executed for each of a large number of models or for each of a large number of processes.

As described above, in the first embodiment, the learning device 10 and the inference device 20 divide the entirety data to generate multiple pieces of divided data Dm, and add the cutting position information Pm to each piece of divided data Dm. The learning device 10 and the inference device 20 generate the learned model 31 for inferring the normal data from the correspondence information that is a set of the divided data Dm and the cutting position information Pm. Consequently, the learning device 10 and the inference device 20 can accurately perform machine learning of the normal state of the inspection target in a short time.

In addition, the inference device 20 compares the normal data with the divided data Dm based on the cutting position information Pm to identify an abnormal portion in the divided data Dm, and identifies the portion having an abnormal state in the entirety data of the inference target based on the identification result. Consequently, the inference device 20 can identify the portion having an abnormal state in the entirety data in a short time.

In the first embodiment, as identification information for identifying the region of each piece of divided data in the entirety data, cutting position information that is information of the position where each piece of divided data is cut from the entirety data is used. However, the identification information may be anything that enables the identification of multiple pieces of divided data cut from the entirety data. For example, if 256 pieces of divided data are generated from one entirety data set, integers of 0 to 255 may be assigned thereto. In that case, the cutaway pieces of divided data only need to correspond one-to-one to the assigned pieces of identification information, and the arrangement order of the pieces of divided data in the entirety data may be different from the order of the integers assigned as the identification information.

Second Embodiment

Next, the second embodiment will be described with reference to FIGS. 10 to 12. In the second embodiment, the learning device 10 combines information representing cutting position information as an image (cutting position image to be described later) with divided data, and executes machine learning using the information obtained by the combination.

Figure 10:
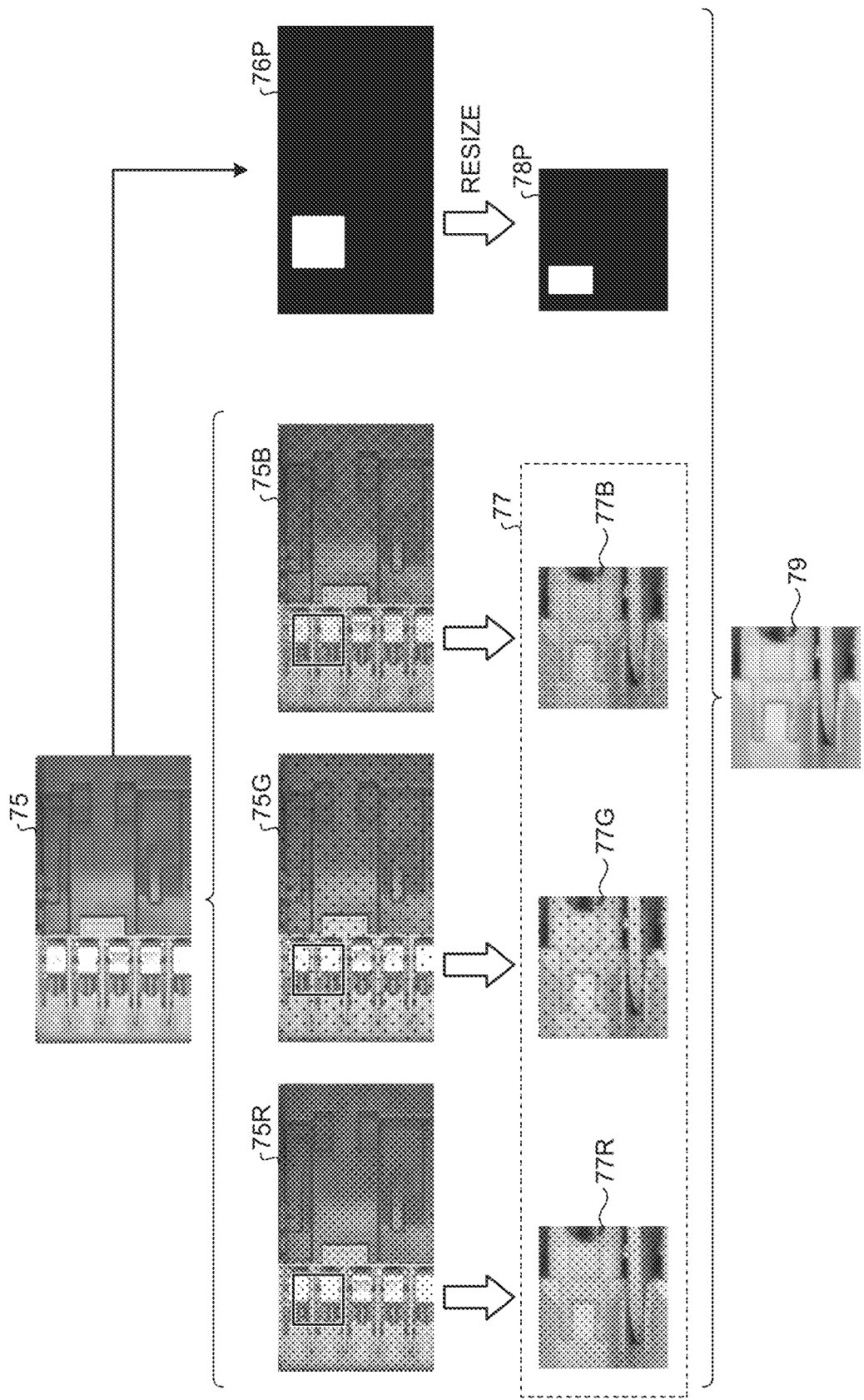
FIG. 10 is a diagram for explaining a cutting image set in divided data for three channels of RGB, colors by a learning device according to a second embodiment.

FIG. 10 is a diagram for explaining a cutting position image set in divided data of three channels of RGB colors by the learning device according to the second embodiment. In a case where a learning image is a full-size image 75 of three channels of RGB (red, green, and blue) colors, the full-size image 75 includes a red image 75R, a green image 75G, and a blue image 75B as images for the three channels.

The data generation unit 16 of the learning device 10 cuts off a divided data piece 77 from the image data of the full-size image 75, and combines information representing the cutting position information of the divided data piece 77 as an image with the divided data piece 77. The divided data piece 77 cut from a specific region of the full-size image 75 by the data generation unit 16 includes the divided data pieces for the three channels. That is, the divided data piece 77 cut from a specific region of the full-size image 75 by the data generation unit 16 includes a red divided data piece 77R, a green divided data piece 77G, and a blue divided data piece 77B.

Note that in FIG. 10, the images 75R, 75G, and 75B are separately illustrated, but the data generation unit 16 does not necessarily need to decompose the full-size image 75 into the images 75R, 75G, and 75B. Similarly, in FIG. 10, the divided data pieces 77R, 77G, and 77B are separately illustrated, but the data generation unit 16 does not necessarily need to decompose the divided data piece 77 into the divided data pieces 77R, 77G, and 77B.

The data generation unit 16 acquires a cutting position image 76P corresponding to the divided data piece 77 including the information of the divided data pieces 77R, 77G, and 77B. That is, the data generation unit 16 acquires the cutting position image 76P representing the position of the divided data piece 77 with respect to the full-size image 75. The cutting position image 76P is data obtained by imaging the cutting position information of the divided data piece 77. An example of the cutting position image 76P is an image in which the cutting position of the divided data piece 77 is expressed in white and the other part is expressed in black.

Furthermore, the data generation unit 16 resizes the cutting position image 76P so that an aspect ratio (ratio of width to height) and an image size of the cutting position image 76P become equal to an aspect ratio and an image size of the divided data piece 77. Consequently, the cutting position image 76P for the divided data piece 77 becomes a cutting position image 78P having the same aspect ratio and image size as the divided data piece 77.

The data generation unit 16 combines the cutting position image 78P with the divided data piece 77 including the divided data pieces 77R, 77G, and 77B. That is, the data generation unit 16 adds the cutting position image 78P to the divided data piece 77 as data for a fourth channel. Consequently, the divided data piece 77 becomes a divided data piece 79 that is a four-channel image for red, green, blue, and position. The model generation unit 14 inputs the four-channel image, namely the divided data piece 79, to the learned model 31. As a result, the learning device 10 can easily perform machine learning by just changing the number of channels without significantly changing the structure of the learned model 31.

The method of combining the cutting position image 78P with the divided data piece 77 can also be applied to a case where the mill-size image has one channel for grayscale. In addition, the method of combining the cutting position image 78P with the divided data piece 77 can also be applied without dependence on any channel to a case where the full-size image is an RGB-depth image including depth (distance) information in addition to RGB.

Note that the inference device 20 may execute the processing described with reference to FIG. 10 in the operation stage of inspection. In this case, the inference device 20 combines the cutting position image 78P with the divided data piece 77, and executes anomaly determination using the information obtained by the combination, namely the divided data piece 79.

Figure 11:
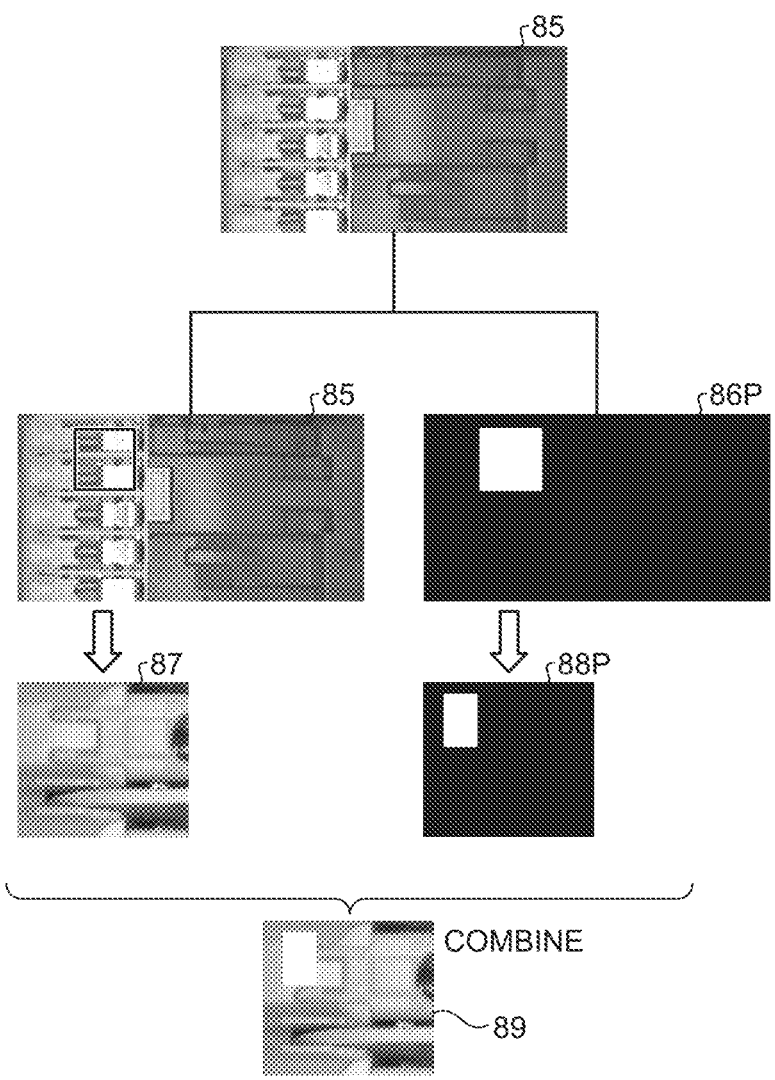
FIG. 11 is a diagram for explaining a cutting image set in divided data for one channel of grayscale by the learning device according to the second embodiment.

FIG. 11 is a diagram for explaining a cutting position image set in divided data of one channel for grayscale by the learning device according to the second embodiment. In a case where the image data of the learning target is a full-size image 85 of one channel for qrayscale, the full-size image 85 includes a grayscale image for one channel.

The data generation unit 16 of the learning device 10 cuts off a divided data piece 87 from the image data of the full size image 85, and combines information representing the cutting position information of the divided data piece 87 as an image with the divided data piece 87. The divided data piece 87 cut from a specific region of the full-size image 85 by the data generation unit 16 includes the divided data piece for one channel.

The data generation unit 16 acquires a cutting position image 86P corresponding to the divided data piece 87. That is, the data generation unit 16 acquires the cutting position image 86P representing the position of the divided data piece 87 with respect to the full-size image 85. The cutting position image 86P is data obtained by imaging the cutting position information of the divided data piece 87. An example of the cutting position image 86P is an image in which the cutting position of the divided data piece 87 is expressed in white and the other part is expressed in black.

Furthermore, the data generation unit 16 resizes the cutting position image 86P so that the aspect ratio and the image size of the cutting position image 86P become the same as the aspect ratio and the image size of the divided data piece 87. Consequently, the cutting position image 86P for the divided data piece 87 becomes a cutting position image 88P having the same aspect ratio and image size as the divided data piece 87. The cutting position image 86P is information similar to the cutting position image 76P, and the cutting position image 88P is information similar to the cutting position image 78P.

The data generation unit 16 combines the cutting position image 88P with the divided data piece 87. That is, the data generation unit 16 adds the cutting position image 88P to the divided data piece 87 as data for the second channel. As a result, the divided data piece 87 becomes a divided data piece 89 that is a two-channel image for grayscale and position. The model generation unit 14 inputs the two image, namely the divided data piece 89, to the learned model 31. Consequently, the learning device 10 can easily perform machine learning with just changing the number of channels without significantly changing the structure of the learned model 31.

Note that the inference device 20 may execute the processing described with reference to FIG. 11 in the operation stage of inspection. In this case, the inference device 20 combines the cutting position image 88P with the divided data piece 87, and executes anomaly determination using the information obtained by the combination, namely the divided data piece 89.

Note that the learning device 10 may use a data array image by which a divided-data cutting region can be identified, instead of the cutting position image 88P set in the divided data of one channel for grayscale.

Figures 12, 13:
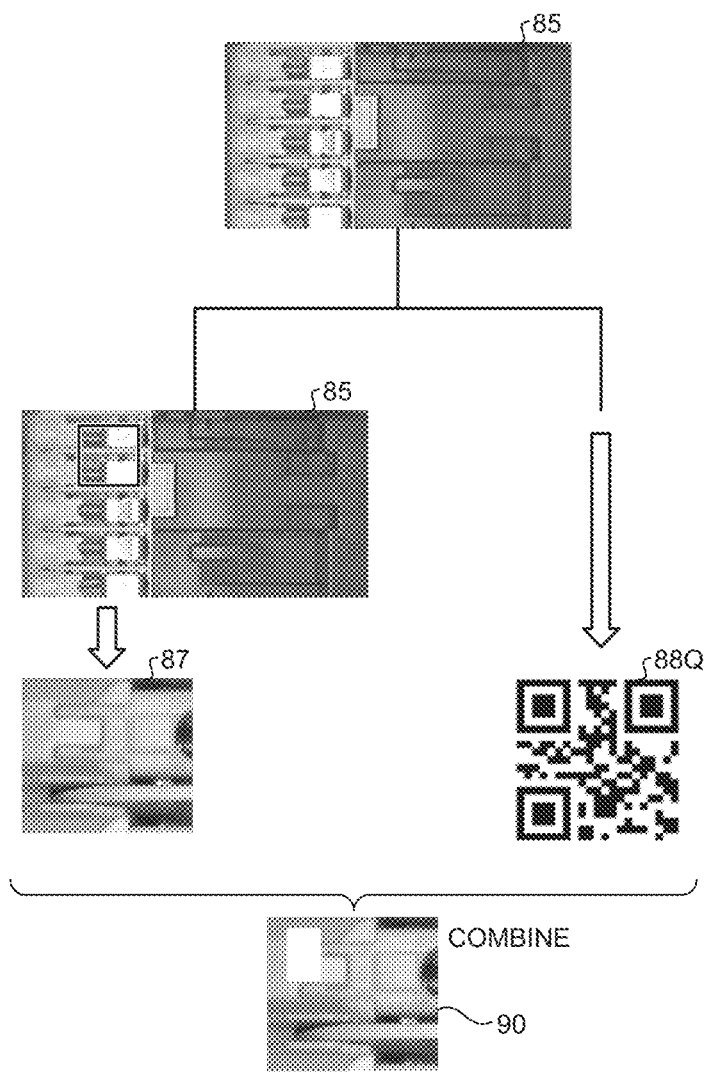
FIG. 12 is a diagram for explaining a data array image by which a divided data cut region set in divided data for one channel of grayscale by the learning device according to the second embodiment is identifiable.
FIG. 13 is a table for explaining a difference between a calculation time in the case where an inference device according to the second embodiment divides a full-size image to execute machine learning and a calculation time in the case where machine learning is executed without dividing the full-size image.

FIG. 12 is a diagram for explaining a data array image by which a divided-data cutting region can be identified and which is set in the divided data of one channel for grayscale by the learning device according to the second embodiment. The data generation unit 16 of the learning device 10 cuts off the divided data piece 87 from the full-size image 85 in substantially the same processing as the processing described with reference to FIG. 11. In addition, the data generation unit 16 sets, in the divided data piece 87, a data array image by which the cutting region of the divided data piece 87 in the full-size image 85 can be identified. The data array image is a two-dimensional code.

Hereinafter, the data array image having such identifiability referred to as an identification data image 88Q. An example of the identification data image 88Q is a quick response (QR) code (registered trademark). The identification data image 88Q is information for identifying the region of the divided data piece 87 in the full-size image 85, which is used here instead of the cutting position images 78P and 88P.

The data generation unit 16 combines the identification data image 88Q with the divided data piece 87. That is, the data generation unit 16 adds the identification data image 88Q to the divided data piece 87 as data for the second channel. As a result, the divided data piece 87 becomes a divided data piece 90 that is a two-channel image for grayscale and position. The model generation unit 14 inputs the two-channel image, namely the divided data piece 90, to the learned model 31. Consequently, the learning device 10 can easily perform machine learning with just changing the number of channels without significantly changing the structure of the learned model 31.

The data generation unit 16 may apply the identification data image 88Q to the full-size image 75 of the three channels for RGB colors. In addition, the inference device 20 may execute the processing described with reference to FIG. 12. In this case, the inference device 20 combines the identification data image 88Q with the divided data piece 87, and executes machine learning using the information obtained by the combination, namely the divided data piece 90. In addition, the inference device 20 may execute the inference of normal data using the divided data piece 90.

In addition, in the data generation units 16 and 26, an image obtained by inverting white and black of the cutting position images 76P, 78P, 86P, and 88P may be used as their cutting position images. Moreover, any colors may be used for the cutting position images 76P, 78P, 86P, and 88P, not only white and black. Also in this case, the data generation units 16 and 26 treat the cutting position images 76P, 78P, 86P, and 88P so that a region of the full-size image occupied by the divided data is expressed in a first color, and another region of the full-size image that is not occupied by the divided data is expressed in a second color.

In addition, the data generation units 16 and 26 may use any information as identification information of the divided data pieces 77 and 87 as long as it is information that is intended to identify the regions of the divided data pieces 77 and 87 and corresponds one-to-one to the divided data pieces 77 and 87. For example, the data generation units 16 and 26 may use a one-dimensional code such as a one-dimensional barcode, as information for identifying the regions of the divided data pieces 77 and 87.

Now the description is given for a difference between the calculation time in the case where the learning device 10 or the inference device 20 divides the full-size image 75 to execute machine learning as described with reference to FIG. 10 and the calculation time in the case where machine learning is executed without dividing the full-size image 75.

FIG. 13 is a table for explaining the difference between the calculation time in the case where the inference device according to the second embodiment divides a full-size image to execute machine learning and the calculation time in the case where the machine learning is executed without dividing the full-size image. Here, the difference in calculation time will be described on the premise that the machine learning is performed by means of deep learning in which neural networks are stacked in multiple layers.

"Full-size learning" is machine learning performed using the full-size image 75 as is, and "cutting learning" is machine learning performed after dividing the full-size image 75 into pieces of divided data. This example is based on the assumption that an image has each side of 1024 pixels in the case of "full-size learning", and an image each side of 64 pixels in the case of "cutting learning". That is, the full-size image 75 has 1024 pixels constituting one side thereof, and an image of the divided data piece has 64 pixels constituting one side thereof.

In the case of "full-size learning", the number of channels is three channels for R, G, and B, and the total number of pixels is 1024×1024×3=3145728. In the case of "cutting learning", the number of channels is four channels for R, G, B, and position, and the total number of pixels is 64×64×4=16384.

The above-described "full-size learning" was executed on 60 full-size images 75, and the learning time thereby was about 720 minutes. On the other hand, in the case of the above-described "cutting learning", the full-size image 75 whose number of pixels is 1024×1024 is divided into (1024×1024)/(64×64)=256 pieces of divided data. Therefore, in the case of "cutting learning", 60 full-size images 75 are divided into 256×60=15360 pieces of divided data.

The learning device 10 or the inference device 20 executed the "cutting learning" on the 15360 pieces of divided data, and the learning time the was about 40 minutes.

As described above, in the "full-size learning", the total number of pixels is 3145728, which corresponds to the number of input layers of the learned model used in the "full-size learning". On the other hand, in the "cutting learning", the total number of pixels is 16384, which is less than 1/100 of that in the "full-size learning". Therefore, in the "cutting learning", the number of input layers of the learned model is also less than 1/100 of that in the "full-size learning", and the number of connections having weights among the input, intermediate, and output layers can also be greatly reduced. As a result, the memory capacity required for machine learning can be significantly reduced as compared with the case of the "full-size learning". In the case of "cutting learning", the total number of images was larger than in the case of "full-size learning", but the learning time could be made about 1/20 shorter than in the case of "full-size learning".

As described above, according to the second embodiment, the learning device 10 combines the cutting position image 78P with the divided data and executes machine learning using the divided data obtained by the combination. Therefore, the learning device 10 can easily perform machine learning with just changing the number of channels without significantly changing the structure of the learned model 31.

Third Embodiment

Next, the third embodiment of the present invention will be described with reference to FIG. 14. In the third embodiment, the inference device 20 directly inputs the cutting position information of the divided data pieces D1 to Dn to the intermediate layer of the learned model.

Figure 14:
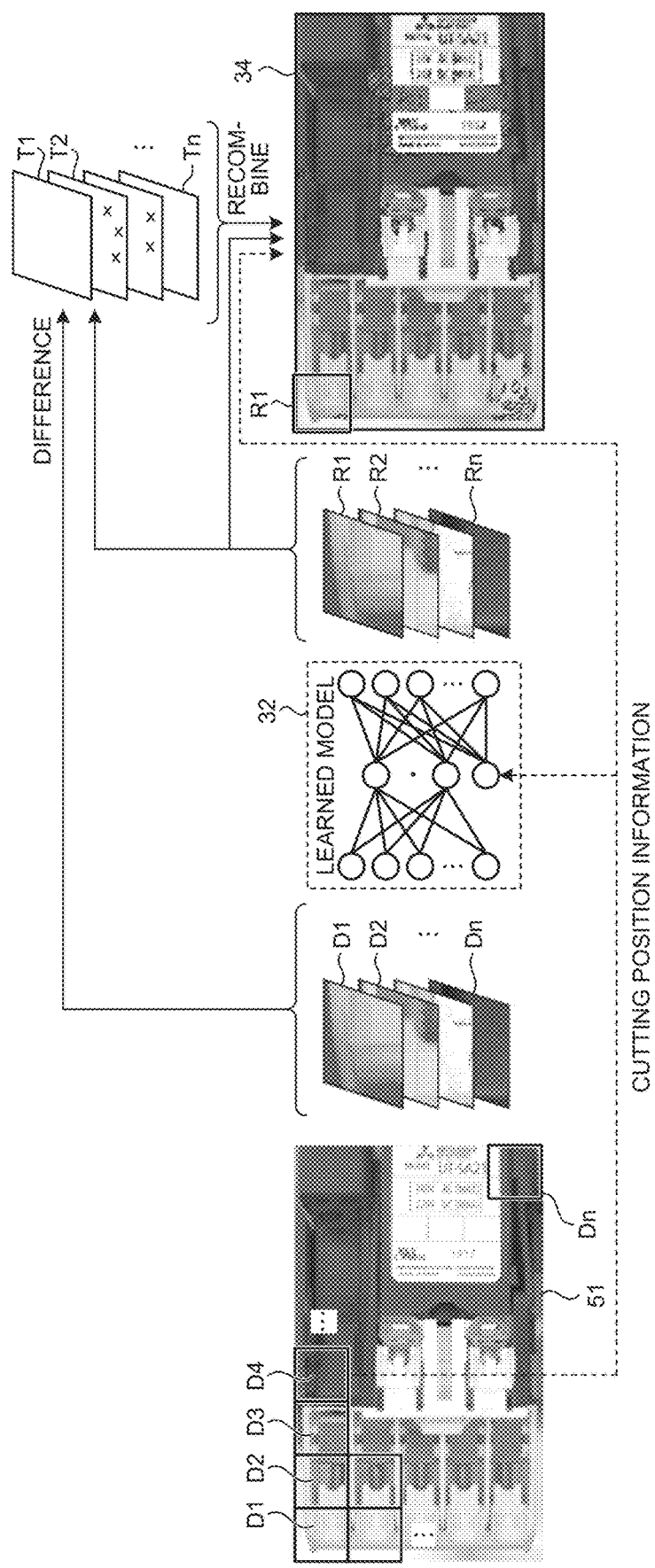
FIG. 14 is a diagram for explaining processing in which an inference device according to a third embodiment directly inputs the cutting position information on divided data to an intermediate layer of the learned model.

FIG. 14 is a diagram for explaining processing in which the inference device according to the third embodiment directly inputs the cutting position information of divided data to the intermediate layer of the learned model. Note that the inference device 20 learns normal data in the described case, but the learning of normal data may be performed by the learning device 10.

In the third embodiment, the data generation unit 26 of the inference device 20 directly inputs, to the intermediate layer of a learned model 32, the cutting position information on the divided data Dm obtained by the cutting from the entirety image 51 that is a full-size image. An example of the cutting position information of the divided data Dm is numerical data such as coordinates of the divided data Dm. The learned model 32 is a neural network similar to the learned model 31.

The data generation unit 26 inputs the divided data Dm to the input layer of the learned model 32 for the divided data Dm, and inputs the cutting position information of the divided data Dm to the intermediate layer thereof. Consequently, the divided data Rm is outputted from the output layer of the learned model 32. The learned model 32 outputs the divided data Rm corresponding to the divided data Dm in substantially the same manner as the learned model 31. Thus, the learned model 32 outputs the divided data pieces R1 to Rn in response to the input of the divided data pieces D1 to Dn.

The data generation unit 26 compares the divided data pieces Di to Dn with the divided data pieces R1 to Rn and generates the divided data pieces T1 to Tn in processing similar to the processing described with reference to FIG. 8. The data generation unit 26 generates an anomaly indication map 34 by recombining the divided data pieces T1 to Tn on the basis of the divided data pieces T1 to Tn and the cutting position information inputted to the intermediate layer of the learned model 32.

As described above, according to the third embodiment, the inference device 20 directly inputs the cutting position information on the divided data pieces D1 to Dn to the intermediate layer of the learned model 32. Therefore, it is possible to execute machine learning without generating correspondence information.

The configurations described in the above-mentioned embodiments illustrate just examples, each of which can be combined with other publicly known techniques or with the other, and can be partially omitted and/or modified without departing from the scope of the present disclosure.

REFERENCE SIGNS LIST 10, 10A learning device; 11, 11A, 21 data acquisition unit; 12, 12A, 22 data cutting unit; 13, 13A, 23 position information adding unit; 14 model generation unit; 15, 15A learned model storage unit; 16, 16A, 26 data generation unit; 20 inference device; 24 inference unit; 31, 32 learned model; 33, 33A, 33X, 34 anomaly indication map; 35, 36 abnormal portion; 51 entirety image; 70 inspection target image; 75, 85 full-size image; 75B, 75G, 75R image; 76P, 78P, 86P, 88P cutting position image; 77, 77B, 77G, 77R, 79, 87, 89, 90 divided data piece; 88Q identification data image; 101 processor; 102 memory; 103 input device; 104 output device; D1 to Dn, R1 to Rn, T1 to Tn divided data piece; P1 to Pn cutting position information piece.

The invention claimed is:

1. A learning device comprising:
processing circuitry configured to acquire learning target data that is full-size data of a learning target;
the processing circuitry further configured to divide the learning target data to generate multiple pieces of first divided data that is divided data of the learning target data, and add, to each piece of the first divided data, first identification information for identifying a region of the first divided data in the learning target data; and
the processing circuitry further configured to generate a learned model for determining an anomaly in the first divided data using first correspondence information that is a set of the first divided data and the first identification information corresponding to the first divided data.

2. The learning device according to claim 1, wherein
in response to receiving the first correspondence information, the learned model outputs first normal data appropriate as normal data of the first divided data.

3. The learning device according to claim 1, wherein
the processing circuitry acquires inference target data that is full-size data of an inference target,
the processing circuitry divides the inference target data to generate multiple pieces of second divided data that is divided data of the inference target data, and adds, to each piece of the second divided data, second identification information for identifying a region of the second divided data in the learning target data, and
the processing circuitry is further configured to determine an anomaly in the inference target data by inputting, to the learned model, second correspondence information that is a set of the second divided data and the second identification information corresponding to the second divided data.

4. The learning device according to claim 3, wherein
in response to receiving the second correspondence information, the learned model outputs second normal data appropriate as normal data of the second divided data, and
the processing circuitry determines an anomaly in the second divided data by comparing the second normal data with the second divided data, and determines an anomaly in the inference target data based on a determination result.

5. The learning device according to claim 4, wherein
the processing circuitry identifies a portion having an abnormal state in the second divided data by comparing the second normal data with the second divided data, and identifies a portion having an abnormal state in the inference target data based on an identification result.

6. The learning device according to claim 3, wherein
the learning target data and the inference target data are image data, and
the processing circuitry is adapted to:
generate the learned model with imaging the first identification information and resizing the first identification information imaged to have an image size equal to an image size of the first divided data, and generating the first correspondence information using the first identification information obtained by the imaging and resizing, to generate the learned model using the first correspondence information generated; and
determine an anomaly in the inference target data with imaging the second identification information and resizing the second identification information imaged to have an image size equal to an image size of the second divided data, and generating the second correspondence information using the second identification information obtained by the imaging and resizing, to input the second correspondence information generated to the learned model.

7. The learning device according to claim 6, wherein
the first identification information is information in which a region of the learning target data occupied by the first divided data is expressed in a first color, and a region of the learning target data that is not occupied by the first divided data is expressed in a second color, and
the second identification information is information in which a region of the inference target data occupied by the second divided data is expressed in the first color, and a region of the inference target data that is not occupied by the second divided data is expressed in the second color.

8. The learning device according to claim 7, wherein when the first color is white, the second color is black, and when the first color is black, the second color is white.

9. The learning device according to claim 6, wherein the first identification information and the second identification information are two-dimensional codes.

10. The learning device according to claim 3, wherein the learned model is a neural network,
the processing circuitry inputs the first identification information to an intermediate layer of the neural network to generate the learned model, and
the processing circuitry inputs the second identification information to the intermediate layer of the neural network to determine an anomaly in the inference target data.

11. The learning device according to claim 3, wherein the learning target data and the inference target data are one-dimensional data.

12. The learning device according to claim 1, wherein the learning target data is image data, and
the processing circuitry is adapted to
generate the learned model with imaging the first identification information and resizing the first identification information imaged to have an image size equal to an image size of the first divided data, and generating the first correspondence information using the first identification information obtained by the imaging and resizing, to generate the learned model using the first correspondence information generated.

13. A learning method comprising:
a data acquisition step of acquiring learning target data that is full-size data of a learning target;
a data generation step of dividing the learning target data to generate multiple pieces of first divided data that is divided data of the learning target data, and adding, to each piece of the first divided data, first identification information for identifying a region of the first divided data in the learning target data; and
a model generation step of generating a learned model for determining an anomaly in the first divided data using first correspondence information that is a set of the first divided data and the first identification information corresponding to the first divided data.

14. An inference device comprising:
processing circuitry configured to acquire inference target data that is full-size data of an inference target;
the processing circuitry further configured to divide the inference target data to generate multiple pieces of divided data of the inference target data, and add, to each piece of the divided data, identification information for identifying a region of the divided data in the inference target data; and
the processing circuitry further configured to determine an anomaly in the inference target data using correspondence information that is a set of the divided data and the identification information corresponding to the divided data and a learned model for determining an anomaly in the divided data using the correspondence information.

15. A non-transitory storage medium in which a program is stored, the program configured to be executed by a computer to cause steps comprising:
a data acquisition step of acquiring learning target data that is full-size data of a learning target;
a data generation step of dividing the learning target data to generate multiple pieces of first divided data that is divided data of the learning target data, and adding, to each piece of the first divided data, first identification information for identifying a region of the first divided data in the learning target data; and
a model generation step of generating a learned model for determining an anomaly in the first divided data using first correspondence information that is a set of the first divided data and the first identification information corresponding to the first divided data.

* * * * *